(12) United States Patent
Lee

(10) Patent No.: US 8,925,495 B1
(45) Date of Patent: Jan. 6, 2015

(54) MULTIFUNCTION PET WASTE SCOOPER

(71) Applicant: Chang Sup Lee, Boyds, MD (US)

(72) Inventor: Chang Sup Lee, Boyds, MD (US)

(*) Notice: Subject to any disclaimer, the term of this patent is extended or adjusted under 35 U.S.C. 154(b) by 152 days.

(21) Appl. No.: 13/693,672

(22) Filed: Dec. 4, 2012

(51) Int. Cl.
*B65H 75/34* (2006.01)
*A01K 29/00* (2006.01)
*A01K 27/00* (2006.01)

(52) U.S. Cl.
CPC .............. *A01K 29/00* (2013.01); *A01K 27/004* (2013.01)
USPC ............ 119/796; 119/161; 119/174; 294/1.3; 294/1.4

(58) Field of Classification Search
CPC ... A01K 27/004; A01K 23/00; A01K 23/005; E01H 1/12; E01H 1/1206; E01H 1/1213
USPC ......... 119/796, 801, 806, 807, 769, 867–869, 119/174, 161; 294/1.3–1.4
See application file for complete search history.

(56) References Cited

U.S. PATENT DOCUMENTS

| | | | |
|---|---|---|---|
| 3,738,697 A * | 6/1973 | Kahan | 294/1.4 |
| 4,248,468 A * | 2/1981 | Hastings | 294/1.4 |
| 4,398,759 A * | 8/1983 | Manola | 294/1.4 |
| 5,380,054 A * | 1/1995 | Galvis | 294/1.4 |
| 5,441,017 A | 8/1995 | Lindsay | |
| 5,595,143 A | 1/1997 | Alberti | |
| 5,762,029 A | 6/1998 | DuBois et al. | |
| 6,019,067 A | 2/2000 | Carey | |
| 6,076,717 A | 6/2000 | Edwards et al. | |
| D439,302 S | 3/2001 | Plewa | |
| 6,223,695 B1 | 5/2001 | Edwards et al. | |
| 6,240,881 B1 | 6/2001 | Edwards et al. | |
| D464,179 S | 10/2002 | Petersen et al. | |
| D480,901 S | 10/2003 | Millington | |
| 6,792,893 B1 | 9/2004 | Quintero et al. | |
| D502,622 S | 3/2005 | Berger | |
| D519,246 S | 4/2006 | Plewa | |
| 7,194,982 B2 | 3/2007 | Edwards | |
| D549,099 S | 8/2007 | Edwards | |
| D573,314 S | 7/2008 | Plewa | |
| D576,433 S | 9/2008 | Che | |
| 7,523,972 B1 * | 4/2009 | Wawrzynowski | 294/1.3 |
| D610,315 S | 2/2010 | Lopusnak et al. | |
| 7,789,042 B1 | 9/2010 | Dinon | |
| 7,850,039 B1 | 12/2010 | Tsengas | |
| 8,061,305 B2 | 11/2011 | Sugalski | |
| D650,622 S | 12/2011 | Morand | |
| D651,768 S | 1/2012 | Bogdahn | |
| 8,100,445 B1 | 1/2012 | Brar | |
| D654,739 S | 2/2012 | Chin et al. | |
| D657,174 S | 4/2012 | Yatscoff | |
| D665,207 S | 8/2012 | Pendleton | |
| D670,871 S | 11/2012 | Desberg | |

(Continued)

*Primary Examiner* — Monica Williams
*Assistant Examiner* — Joshua Huson

(57) ABSTRACT

The present invention features a multifunction pet waste scooper. The multifunctional pet waste scooper also integrates with pet leash and plastic bag holder. The multifunctional pet waste scooper comprises a handle housing, a connection tube and two scoops. The scoops are closed in default state and can be opened by a Y-shape bracelet pulled back a spring loaded trigger. When the trigger is released, the spring will push the scoops to be closed. The pet waste scooper further comprises a retractable pet leash to hook a collar used on a pet and a curved slot disposed on the handle housing to hang a bag containing pet waste.

11 Claims, 6 Drawing Sheets

(56) References Cited

U.S. PATENT DOCUMENTS

| | | |
|---|---|---|
| 8,312,599 B2 | 11/2012 | Vogl et al. |
| 2004/0174026 A1* | 9/2004 | Sampaio .......................... 294/1.4 |
| 2008/0042456 A1* | 2/2008 | Patel .............................. 294/1.3 |
| 2008/0136201 A1* | 6/2008 | Dong .............................. 294/1.3 |
| 2008/0303295 A1* | 12/2008 | Moreno Fernandez De Betono .......................... 294/1.3 |
| 2012/0006284 A1 | 1/2012 | Messner |
| 2013/0008392 A1 | 1/2013 | Holmstrom |

* cited by examiner

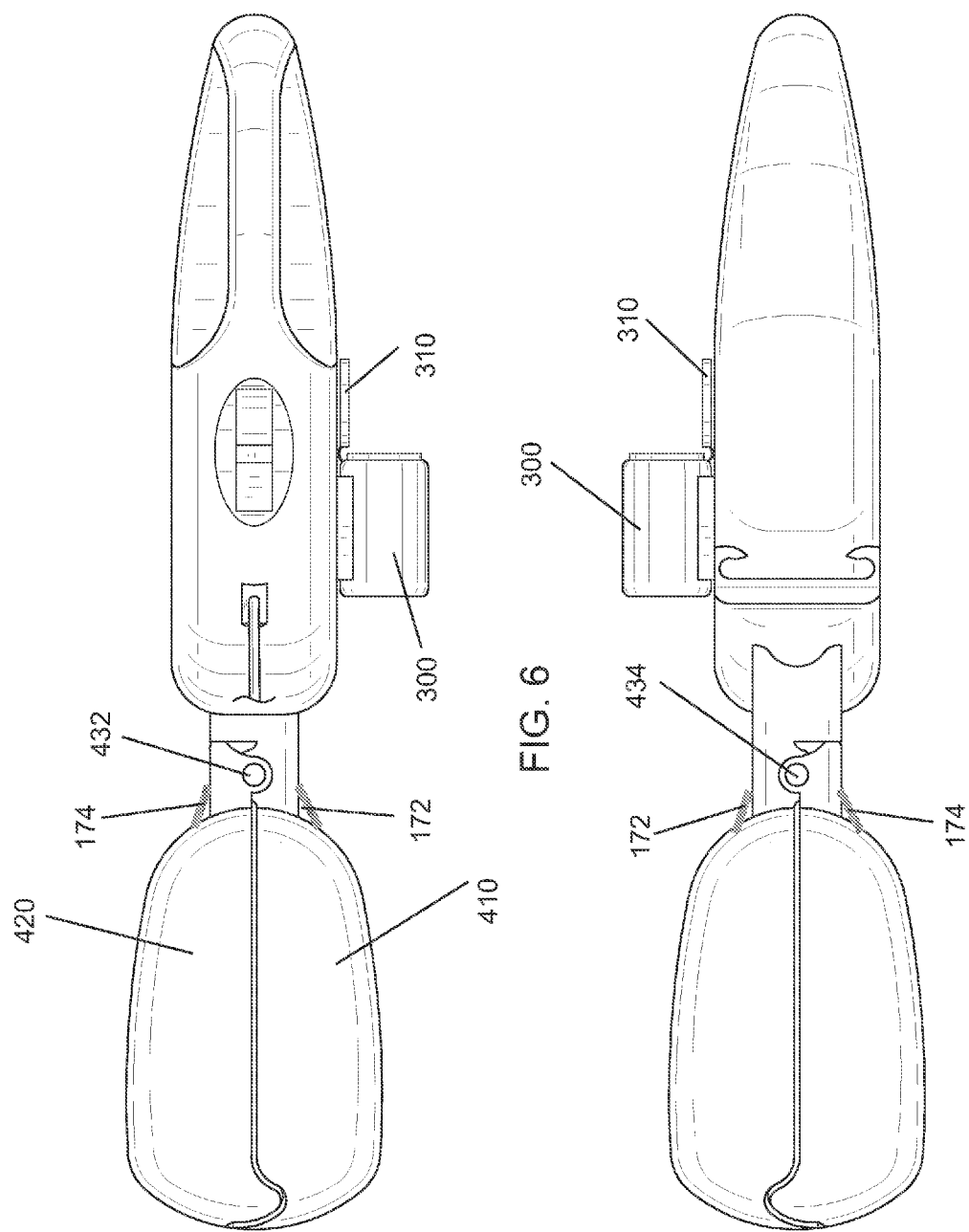

MULTIFUNCTION PET WASTE SCOOPER

FIELD OF THE INVENTION

The present invention related to a multifunctional pet waste scooper, and more particularly to a multifunctional pet waste scooper integrated with pet leash and plastic bag holder.

BACKGROUND OF THE INVENTION

Many dog owners have faced the situation that they have to pick up the water of their dogs with their hand covered with plastic bags. It's both inconvenient and nasty. There is a need for a hand-free waste scooper such that a user does not need to use his/her hands to pick up the waste. Moreover, there is a need for a combination of waste scooper with other functions such as pet leash, so that a user does not need carry many tools when he/she walks with the pet.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a multifunction pet waste scooper. The multifunctional net waste scooper also integrates with pet leash and plastic bag holder. The multifunctional pet waste scooper comprises a handle housing, a connection tube and two scoops. The scoops are closed in default state and can be opened by a Y-shape bracelet pulled back a spring loaded trigger. When the trigger is released, the spring will push the scoops to be closed. The pet waste scooper further comprises a retractable pet leash to hook a collar used on a pet and a curved slot disposed on the handle housing to hang a bag containing pet waste.

BRIEF DESCRIPTION OF THE DRAWINGS

FIG. 6 shows a top-side view of a multifunction pet waste scooper.

FIG. 7 shows a bottom-side view of a multifunction pet waste scooper.

DESCRIPTION OF PREFERRED EMBODIMENTS

Figure 1:
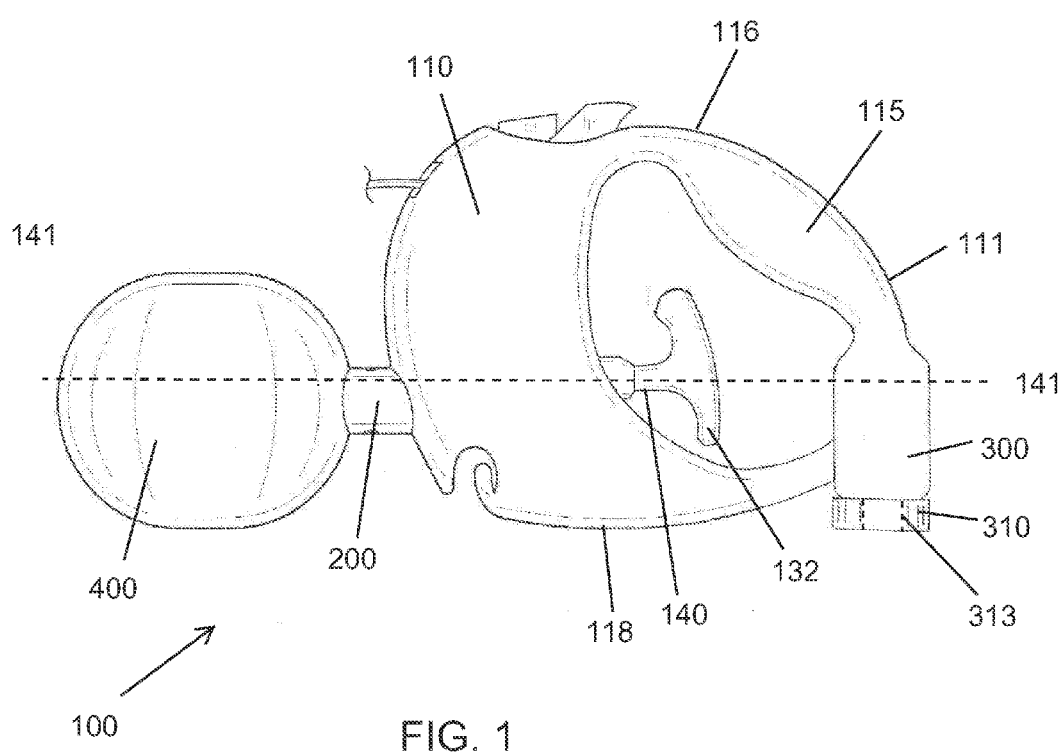
FIG. 1 shows a front-side view of a multifunction pet waste scooper with a waste bag holder integrated with the handle.
Figure 2:
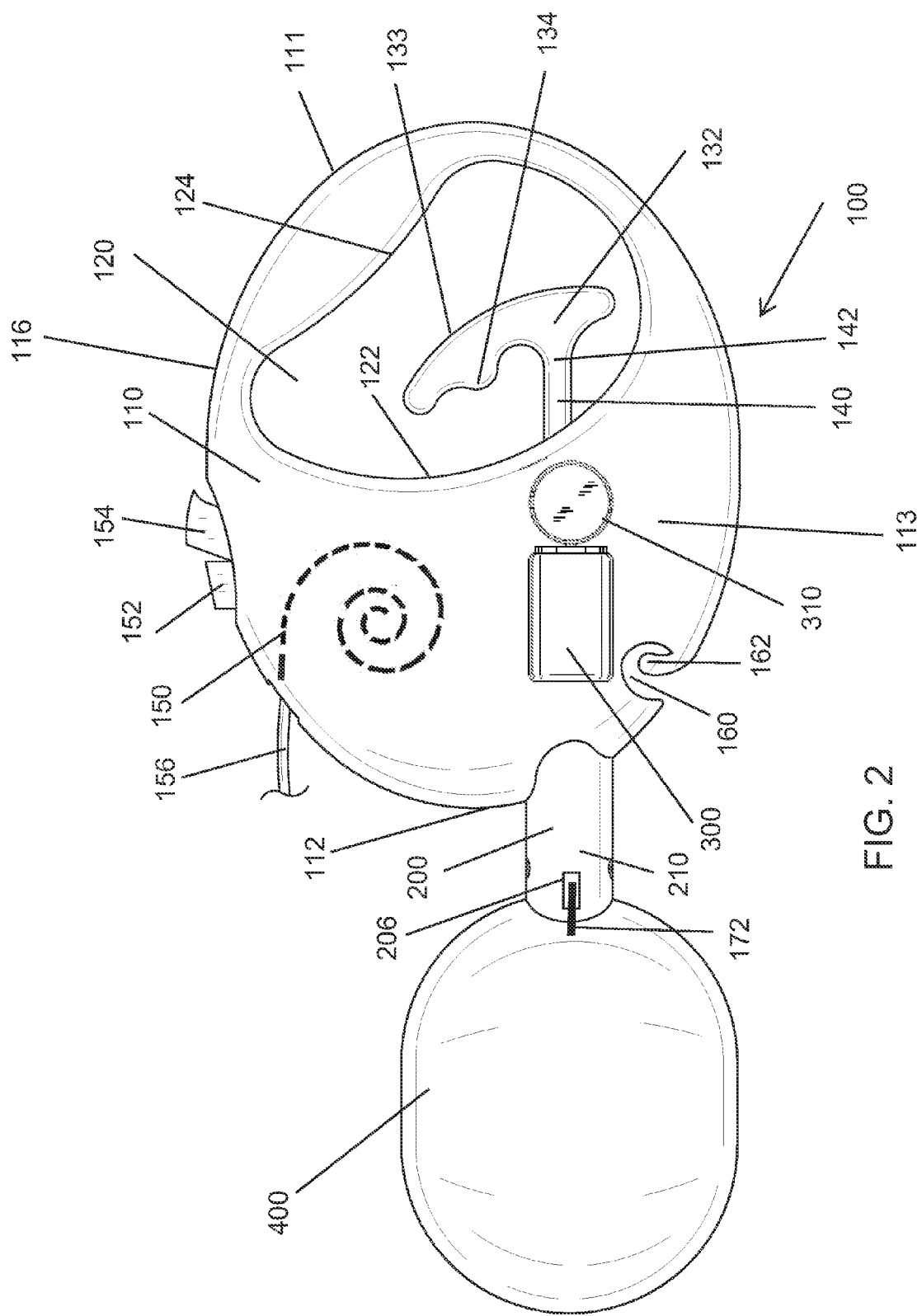
FIG. 2 shows a front-side view of a multifunction pet waste scooper with a retractable coil within the handle housing.
Figure 3:
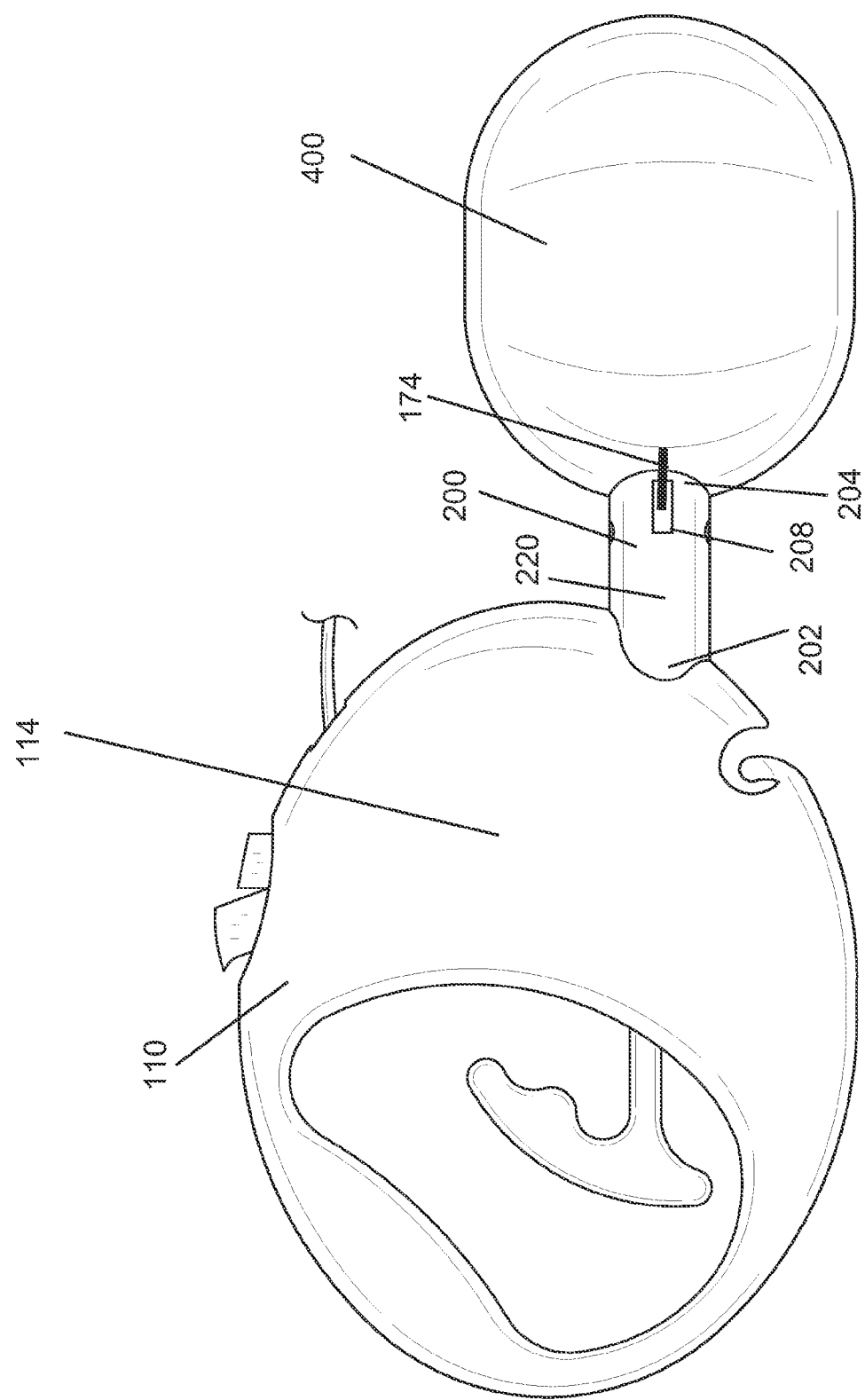
FIG. 3 shows a back-side view of a multifunction pet waste scooper.
Figure 5:
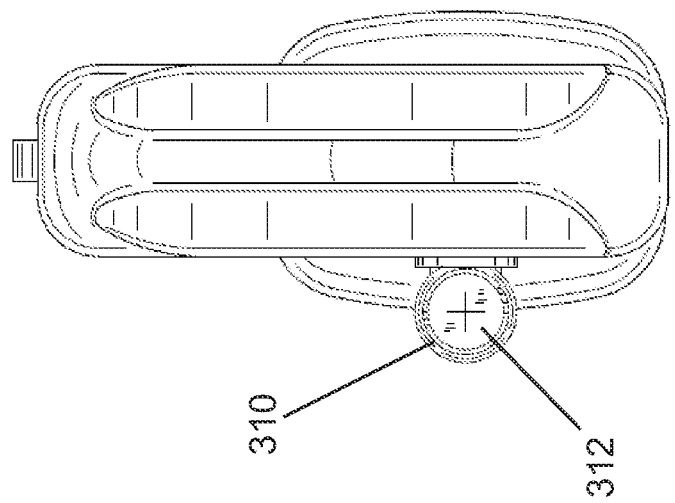
FIG. 5 shows a first end view of a multifunction pet waste scooper.
Figure 4:
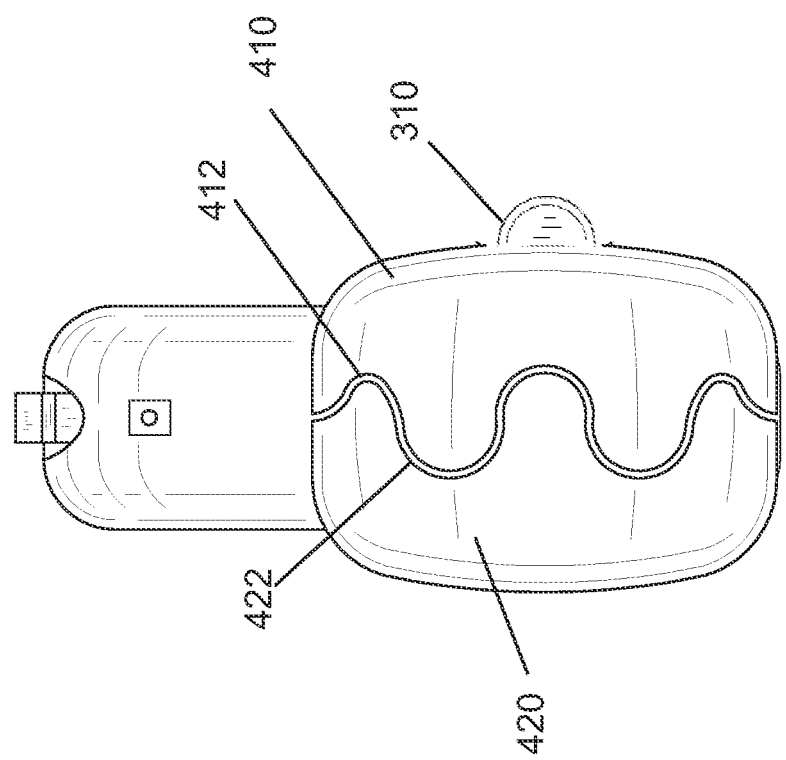
FIG. 4 shows a second end view of a multifunction pet waste scooper.
Figure 8:
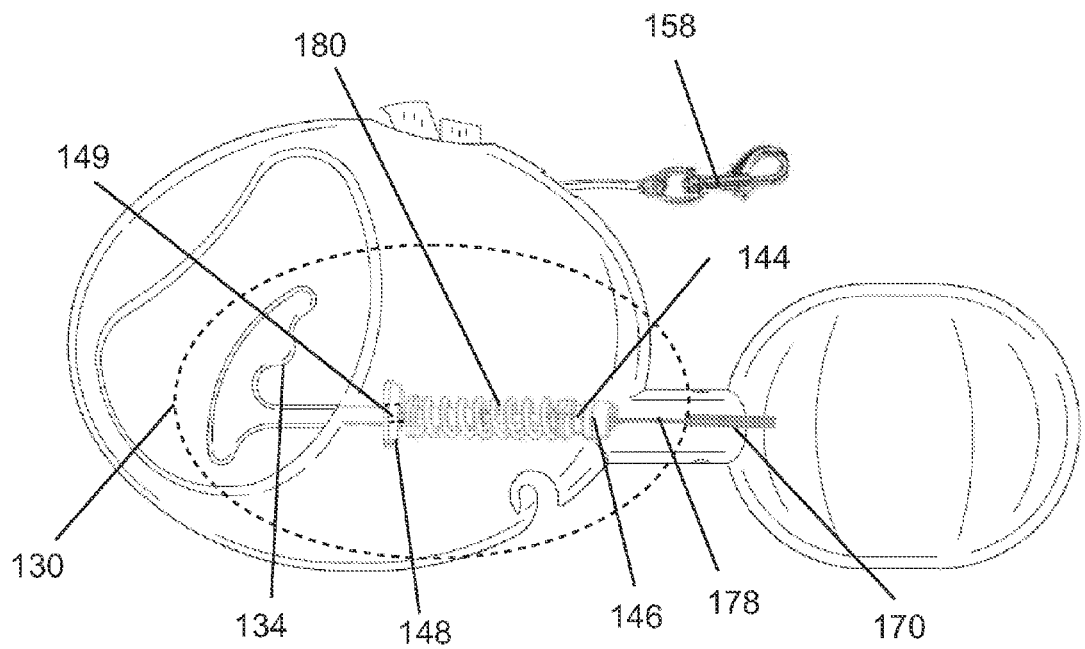
FIG. 8 shows an X-ray back-side view of a multifunction pet waste scooper with the scoops closed.
Figure 9:
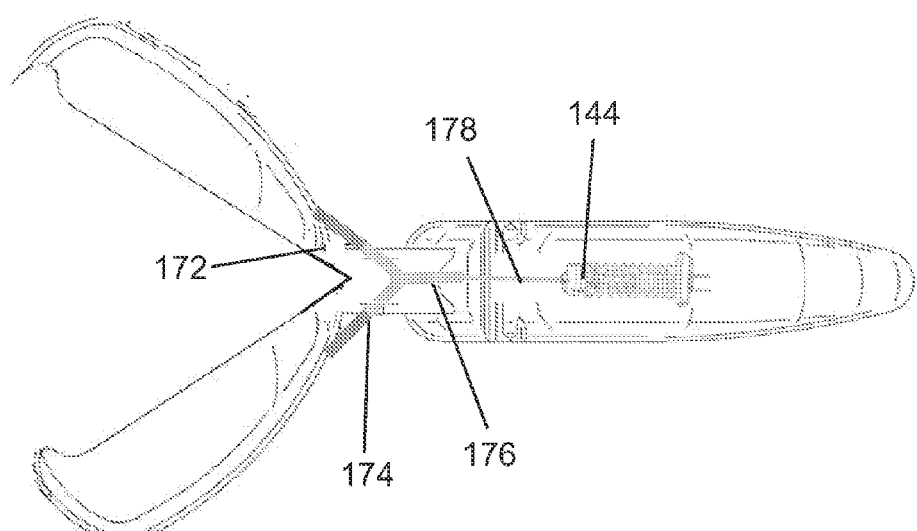
FIG. 9 shows an "X-ray" bottom-side view of a multifunction pet waste scooper with the scoops open.

Referring now to FIG. 1-9, the present invention features a multifunction pet waste scooper (100). The multifunctional pet waste scooper also integrates with pet leash and plastic bag holder. The multifunctional pet waste scooper comprises a handle housing (110), a connection tube (200), a plastic bag container (300) and a scoop component (400).

The handle housing has an oval profile with a first end (111), a second end (112), a front side (113), a back side (114), a first side (116) and a second side (118).

The handle housing (110) comprises a retractable coil (150) of a pre-set length of cable (156) for pet leash disposed within the housing near the first side (116) with a first opening disposed on the first housing for the cable (156) to be pulled out from the coil, wherein a pet leash (158) is disposed at external end of the retractable coil (150), wherein a first button (152) and a second button (154) are disposed on the first side (116), wherein when the first button (152) is pressed, the retractable coil (150) starts to retract the cable (156) into the handle housing (110), wherein when the second button (154) is pressed, the retractable coil (150) is locked and prevented from retracting.

The handle housing (110) also comprises a cavity (120) disposed within the handle housing (110) near the first end (111), wherein the cavity is confined by a first inner side (122) and a second inner side (124) of the handle housing (110), wherein a handle (115) is formed between the second inner side (124) and the first side (111) of the handle housing.

The handle housing (110) further comprises a spring loaded trigger (130) having a knob (132) and a rod (140) with a center axis (141), wherein the rod (140) extends into the handle housing (110) via a second opening disposed on the second inner side (124), wherein the rod (140) has a first rod end (142) and a second rod end (144), wherein the knob (132) has a first knob side (133) and a second knob side (134), wherein the second side (134) is connected to the first rod end (142), wherein a first plate (146) is disposed on the second rod end (144), wherein a second plate (148) is disposed along the rod (140) between the first rod end (142) and second rod end (144), wherein the second plate is fixedly placed within the handle housing (110), wherein the second plate (148) has a center aperture (149) such that the rod (140) is able to slide through the second plate (148), wherein a spring (180) is placed between the first plate (146) and second plate (148), wherein the spring (180) is biased in an expanded position, wherein when the knob (132) is pulled toward to the direction of the first end of the handle housing (111), the first plate (146) also moves on the same direction and the spring is compressed between the fixedly positioned second plate (148) and movable first plate (146), when the knob is released, the spring decompresses and causes the first plate to move away the direction of the first end of the handle housing (110).

The connection tube (200) with a first tube end (202), a second tube end (204), a first tube surface (210) and a second tube surface (220), wherein the first tube end (202) of connection tube connects to the second end of the handle housing (110), wherein a first slot (206) is disposed on the first tube surface (210) and a second slot (208) is disposed on the second tube surface (220).

The scope component (400) has a first scoop (410) and a second scoop (420), wherein the scoop component connected to the second tube end (204), wherein the first scoop and second scoop are connected together via a first hinge (432) and a second hinge (434) such that the first scoop and second scoop can pivotably move between a closed position and open position; wherein the first scoop and second scoop are dragged between a closed position and open position by a Y-shape brace (170), wherein the brace has a first arm (172), a second arm (174) and a third arm (176), wherein the first arm (172) is attached to the first scoop (410) through the first slot (206) and second arm (174) is attached to the second scoop (420) through the second slot (208), wherein the third arm (176) connected to the first plate (146) via a second rod (178), wherein the second cable (178) and the third arm (176) are disposed inside the connection tube (200).

When the knob (132) is pulled toward to the direction of the first end of the handle housing (111), the first plate (146) also moves on the same direction together with the Y-shape brace (170), wherein the first arm (172) and second arm (174) pull the first scoop (410) and second scoop (420) to an open position; when the knob is released, the spring decompresses and pushes the first plate and the Y-shape brace (170) away the direction of the first end of the handle housing (110), wherein the first arm (172) and second arm (174) push the first scoop (410) and second scoop (420) to a closed position.

In some embodiments, the handle housing (110) further comprises a curved slot (160) disposed on the second side (118), wherein the slot (160) forms a hook (162). The hook (162) can be used to hang a bag containing pet waste.

In some embodiments, the pet waste scooper (100) further comprises a plastic bag bottle (300) to store plastic bag, wherein the plastic bag bottle comprises a lid (310), wherein the lid (310) is pivotably attached to the bottle (300). In some embodiments, the bottle (300) can be also used for storing wipers. In some embodiment, the plastic bag bottle (300) is integrated within handle (115), wherein the plastic bag bottle (300) is generally perpendicular to the center axis (141) of the rod (140), wherein the plastic bag bottle (300) is facing away from the first side (116) of the handle housing (110). In some embodiments, the plastic bag bottle (300) is disposed on the front side (113) of the handler housing (110).

The lid is configured for plastic bag reload when the lid is opened. In some embodiments, the lid (310) further comprises a cross cut (312) on the lid for pulling out a plastic bag while retaining the remaining bags inside the bottle. In some embodiments, the lid (310) further comprises a hole (313) for pulling out a plastic bag without opening the lid. In some embodiments, the hole (313) has a diameter of ½ inch. In some embodiments, the hole (313) has a diameter of 1 inch.

In some embodiments, the first scoop (410) and second scoop (420) is has an antibacterial coating. The first scoop (410) and second scoop (420) are closed in the default position. The knob (132) has to be pulled to open the scoops to pick up pet waste. Upon releasing the knob, the scoops closed immediately such that a user does not need to keep pulling the knob to retain the pest waste.

In some embodiments, the first scoop (410) has a first wave shape edge (412) and the second scoop (420) has a second wave shape edge (422), wherein the first wave shape edge (412) is configured to match the second wave shape edge (422) such that the first scoop (410) and the second scoop (420) can close tightly. The scoops are closed in default state and can be opened by a Y-shape bracelet pulled back a spring loaded trigger. When the trigger is released, the spring will push the scoops to be closed. The pet waste scooper further comprises a retractable pet leash to hook a collar used on a pet and a curved slot disposed on the handle housing to hang a bag containing pet waste.

The knob (132) is well known for ordinary people in the art. In some embodiments, the second knob side (134) has a wave line profile with two or three curves for grip enhancement. In some embodiments, the knob has a grip pad disposed on the first knob side and/or the second knob site.

In some embodiments, the connection knob (200) is below 1 foot in length such that the whole pet waste scooper is compact in size. In some embodiments, the connection knob (200) is more than 3 feet foot in length such that a user can easily collect pet, waste without bending or crouching. This would be beneficial for those people with back spike pain.

As used herein, the term "about" refers to plus or minus 10% of the referenced number. For example, 3 feet in length refers to length between 2.7 feet and 3.3 feet.

The disclosures of the following U.S. Patents are incorporated in their entirety by reference herein: U.S. Pat. No. 6,848,751, U.S. Pat. No. 5,286,092, U.S. Pat. No. 8,020,954, U.S. Pat. No. 4,441,762, U.S. Pat. No. 5,152,584, U.S. Pat. No. 7,314,254, US patent application publication 2007/0052280.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below cairns are solely for ease of examination of this patent application, and are exemplary, and are not intended in any way to limit the scope of the claims to the particular features having the corresponding reference numbers in the drawings.

What is claimed is:

1. A multifunction pet waste scooper (100) for collecting pet waste, the scooper comprising:

(i) a handle housing (110), wherein the handle housing has an oval profile with a first end (111), a second end (112), a front side (113), a back side (114), a first side (116) and a second side (118), wherein the handle housing (110) comprising:

(a) a retractable coil (150) of a pre-set length of cable (156) for a pet leash disposed within the housing near the first side (116) with a first opening disposed on the first housing for the cable (156) to be pulled out from the coil, wherein a pet leash (158) is disposed at external end of the retractable coil (150), wherein a first button (152) and a second button (154) are disposed on the first side (116) wherein when the first button (152) is pressed, the retractable coil (150) starts to retract the cable (156) into the handle housing (110), wherein when the second button (154) is pressed, the retractable coil (150) is locked and prevented from retracting;

(b) a cavity (120) disposed within the handle housing (110) near the first end (111), wherein the cavity is confined by a first inner side (122) and a second inner side (124) of the handle housing (110), wherein a handle (115) is formed between the second inner side (124) and the first side (111) of that the handle housing;

(c) a spring loaded trigger (130) having a knob (132) and a rod (140) with a center axis (141), wherein the rod (140) extends into the handle housing (110) via a second opening (134) disposed on the second inner side (124), wherein the rod (140) has a first rod end and a second rod end, wherein the knob (132) has a first knob side (133) and a second knob side (134), wherein the second side (134) is connected to the first rod end, wherein a first plate (146) is disposed on the second rod end, wherein a second plate (148) is disposed along the rod (140) between the first rod end (142) and second rod end (144), wherein the second plate is fixedly placed within the handle housing (110), wherein the second plate (148)

has a center aperture (149) such that the rod (140) is able to slide through the second plate (148), wherein a spring (180) is placed between the first plate (146) and second plate (148), wherein the spring (180) is biased in an expanded position, wherein when the knob (132) is pulled toward to the direction of the first end of the handle housing (111), the first plate (146) also moves in the same direction and the spring is compressed between the fixedly positioned second plate (148) and movable first plate (146), and when the knob is released, the spring decompresses and causes the first plate to move away from the direction of the first end of the handle housing (110);

(ii) a connection tube (200) with a first tube end (202), a second tube end (204), a first tube surface (210) and a second tube surface (220), wherein the first tube end (202) of the connection tube connects to the second end of the handle housing (110), wherein a first slot (206) is disposed on the first tube surface (210) and a second slot (208) is disposed on the second tube surface (220);

(iii) a scooper component (400) having a first scoop (410) and a second scoop (420), wherein the scoop component is connected to the second tube end (204), wherein the first scoop and second scoop are connected together via a first hinge (432) and a second hinge (434) such that the first scoop and second scoop can pivotably move between a closed position and open position; wherein the first scoop and second scoop are dragged between a closed position and open position by a Y-shape brace (170), wherein the brace has a first arm (172), a second arm (174) and a third arm (176), wherein the first arm (172) is attached to the first scoop (410) through the first slot (206) and second arm (174) is attached to the second scoop (420), through the second slot (208), wherein the third arm (176) connected to the first plate (146) via a second rod (178), wherein the second rod (178) and the third arm (176) are disposed inside the connection tube (200);

wherein when the knob (132) is pulled toward in the direction of the first end of the handle housing (111), the first plate (146) also moves in the same direction together with the Y-shape brace (170), wherein the first arm (172) and second arm (174) pull the first scoop (410) and second scoop (420) to an open position; and when the knob is released, the spring decompresses and pushes first plate and the Y-shape brace (170) away from the direction of the first end of the handle housing (110), wherein the first arm (172) and second arm (174) push the first scoop (410) and second scoop (420) to a closed position.

2. The pet waste scooper (100) of claim 1, wherein the pet waste scooper (100) further comprises a plastic bag bottle (300) to store plastic bag, wherein the plastic bag bottle comprises a lid (310), wherein the lid (310) is pivotably attached to the bottle (300), wherein the plastic bag bottle (300) is integrated within handle (115), wherein the plastic bag bathe (300) is generally perpendicular to the center axis (141) of the rod (140), wherein the plastic bag bottle (300) is facing away from the first side (116) of the handle housing (110).

3. The pet waste scooper (100) of claim 2, wherein the lid (310) further comprises a cross cut (312) on the lid for pulling out a plastic bag without opening the lid.

4. The pet waste scooper (100) of claim 2, wherein the lid (310) further comprises a hole (313) for pulling out a plastic bag without opening the lid.

5. The pet waste scooper (100) of claim 1, wherein the pet waste scooper (100) further comprises a plastic bag bathe (300) to store plastic bag, wherein the plastic bag bottle comprises a lid (310), wherein the lid (310) is pivotably attached to the bottle (300), wherein the plastic bag bottle (300) is disposed on the front side (113) of the handler housing (110).

6. The pet waste scooper (100) of claim 5, wherein the lid (310) further comprises a cross cut (312) on the lid for pulling out a plastic bag without opening the lid.

7. The pet waste scooper (100) of claim 5, wherein the lid (310) further comprises a hole (313) for pulling out a plastic bag without opening the lid.

8. The pet waste scooper (100) of claim 1, wherein the handle housing (110) further comprises a curved slot (160) disposed on the second side (118), wherein the slot (160) forms a hook (162).

9. The pet waste scooper (100) of claim 1, wherein the first scoop (410) and second scoop (420) is has an antibacterial coating.

10. The pet waste scooper (100) of claim 1, wherein the first scoop (410) has a first wave shape edge (412) and the second scoop (420) has a second wave shape edge (422), wherein the first wave shaped edge (412) is configured to matingly interlock with the second wave shape edge (422) such that the first scoop (410) and the second scoop (420) can close tightly.

11. The pet waste scooper (100) of claim 1 wherein the second knob side (134) has a wave line profile with two or three curves for grip enhancement.

* * * * *